United States Patent
Foiret

(10) Patent No.: US 9,269,206 B2
(45) Date of Patent: Feb. 23, 2016

(54) SYSTEM FOR MONITORING A MEASUREMENT CHAIN OF A TURBOJET ENGINE

(75) Inventor: Guilhem Foiret, Paris (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/343,899

(22) PCT Filed: Sep. 5, 2012

(86) PCT No.: PCT/FR2012/051984
§ 371 (c)(1),
(2), (4) Date: Mar. 10, 2014

(87) PCT Pub. No.: WO2013/038091
PCT Pub. Date: Mar. 21, 2013

(65) Prior Publication Data
US 2014/0236415 A1    Aug. 21, 2014

(30) Foreign Application Priority Data
Sep. 15, 2011  (FR) ...................................... 11 58211

(51) Int. Cl.
*G07C 5/08* (2006.01)
*B64F 5/00* (2006.01)
*G01M 15/14* (2006.01)
*G05B 23/02* (2006.01)

(52) U.S. Cl.
CPC ............ *G07C 5/0816* (2013.01); *B64F 5/0045* (2013.01); *G01M 15/14* (2013.01); *G05B 23/0221* (2013.01); *G05B 23/0232* (2013.01)

(58) Field of Classification Search
None
See application file for complete search history.

(56) References Cited

U.S. PATENT DOCUMENTS

| | | | |
|---|---|---|---|
| 6,314,350 B1 | 11/2001 | Butz et al. | |
| 8,930,120 B2 * | 1/2015 | Kwon et al. | ........... 701/111 |
| 2008/0312783 A1 * | 12/2008 | Mansouri et al. | ........... 701/29 |

FOREIGN PATENT DOCUMENTS

EP    1 106 504    6/2001

OTHER PUBLICATIONS

International Search Report Issued Dec. 18, 2012 in PCT/FR12/051984 Filed Sep. 5, 2012.

* cited by examiner

*Primary Examiner* — Calvin Cheung
*Assistant Examiner* — Krishnan Ramesh
(74) *Attorney, Agent, or Firm* — Oblon, McClelland, Maier & Neustadt, L.L.P.

(57) ABSTRACT

A method and a system for monitoring a measuring chain arranged to collect over time measures relating to a turbojet engine of an aircraft, the system including a processor configured to build a health indicator of the measuring chain based on counting transitions between successive health words defining a validity score of corresponding successive measures.

8 Claims, 5 Drawing Sheets

| Status of the likelihood test Path 3a | Status of the likelihood test Path 3b | Status of the deviation test between paths | Health word |
|---|---|---|---|
| OK | OK | OK | 1 |
| OK | OK | NOK | 2 |
| OK | NOK | / | 3 |
| NOK | OK | / | 4 |
| NOK | NOK | / | 5 |

| Status of the likelihood test Path 3a | Status of the likelihood test Path 3b | Status of the deviation test between paths | Health word |
|---|---|---|---|
| OK | OK | OK | 1 |
| OK | OK | NOK | 2 |
| OK | NOK | / | 3 |
| NOK | OK | / | 4 |
| NOK | NOK | / | 5 |

FIG.3

| | | Weight of the "health word" at instant t+1 | | | | |
|---|---|---|---|---|---|---|
| | Transitions | 1 | 2 | 3 | 4 | 5 |
| Weight of the "health word" at instant t | 1 | $a_{11}$ | $a_{12}$ | $a_{13}$ | $a_{14}$ | $a_{15}$ |
| | 2 | $a_{21}$ | $a_{22}$ | $a_{23}$ | $a_{24}$ | $a_{25}$ |
| | 3 | $a_{31}$ | $a_{32}$ | $a_{33}$ | $a_{34}$ | $a_{35}$ |
| | 4 | $a_{41}$ | $a_{42}$ | $a_{43}$ | $a_{44}$ | $a_{45}$ |
| | 5 | $a_{51}$ | $a_{52}$ | $a_{53}$ | $a_{54}$ | $a_{55}$ |

FIG.4

| Measure status Local path | Measure status Other path | Model status | Status of the deviation test between paths | Status of the local path/model test | Status of the other path/model test | Selected values | SST |
|---|---|---|---|---|---|---|---|
| Valid | Valid | / | TRUE | / | / | Average (local path, other path) | 1 |
| Valid | Valid | Valid | FALSE | TRUE | FALSE | Local path | 1 |
| Valid | Valid | Non valid | FALSE | / | / | Max (local path, other path) | 2 |
| Valid | Valid | Valid | FALSE | FALSE | TRUE | Other path | 1 |
| Valid | Valid | Valid | FALSE | TRUE | TRUE | | |
| Valide | Valide | Valide | FALSE | FALSE | FALSE | If Average (local path, other path) = value of the model) Then Max (local path, other path) Otherwise, value closest to the model, Local | 3 |
| Valid | Non valid | / | / | / | / | Local path | 1 |
| Non valid | Valid | / | / | / | / | Other path | 1 |
| Non valid | Non valid | Valid | / | / | / | Model | 4 |
| Non valid | Non valid | Non valid | / | / | / | Model | 5 |

FIG.6

SYSTEM FOR MONITORING A MEASUREMENT CHAIN OF A TURBOJET ENGINE

TECHNICAL FIELD

The present invention relates to the field of monitoring a measuring chain of an aircraft engine and more particularly, of a system for monitoring intermittent contacts of the measuring chain.

STATE OF PRIOR ART

Generally speaking, a measuring chain has two redundant parts arranged to collect over time physical measures relating to a turbojet engine of an aircraft. These measures can be temperature, pressure, speed, LVDT (Linear Variable Differential Transformer) measures, etc. Each measuring part has a probe connected via connectors and harnesses to a computer controlling the turbojet engine.

Thus, an intermittent contact due to an ill-timed ground return or to an intermittently open circuit may occur over time at the connectors, harnesses or within the probe itself. The intermittent contacts can be generated by strong vibrations, and/or by a low retention force, and/or by a presence of pollution, and/or by corrosion at a connection point, etc. These intermittent contacts can possibly create depending on the type of the measuring chain and the filtering technology used, bias, interference, or peak type defects of the signal for measuring the incremented measuring chain.

Presently, there is no solution for monitoring intermittent contacts, except for the treatment of the failure statuses provided by the regulation which has the function to drive the engine. Within the scope of the present invention and in the whole description, by "regulation" it is meant the input analysis carried out by the computer in order to check whether the measure is non aberrant. This analysis which is performed at the software level of the computer comprises likelihood and deviation tests.

The likelihood test (or zone test) is applicable to all non discrete measures. This test is based on the comparison of an input with a minimum threshold and a maximum threshold with performance of a validity word indicating that the input lies inside or outside the likelihood range.

Deviation (or cross-check) tests generally include three tests: a first deviation test between both redundant paths of the measuring chain, a second deviation test between the measure of the first path (local path) and a corresponding model (in so far as a model of the measure is available, which is not always the case), and a third deviation test between the measure of the second path (other path) and the corresponding model. It will be noted that if no model for the measure is available, the deviation test can be carried out with respect to a reference measure (for example, aircraft pressure measure). When no model and no reference are available, only the deviation test between paths is carried out.

When both measures of both paths are sound with respect to the likelihood test, the computer carries out a deviation test therebetween. Indeed, it is possible that the measures are sound from an electric point of view and that they are included in their likelihood range but they are deviated from each other. In this case, the computer tries to detect this deviation because it means that one of both measures is failed (or even both). However, the detection of a deviation between these measures does not allow a failed measure to be located. Thus, in order to locate the defect, the computer carries out a deviation test between the measure of each path and a preset corresponding model.

When a likelihood or deviation test is invalidated, a maintenance word is raised, that is its bit switches to 1. It will be noted that in general, most maintenance words that do not impact the operability of the engine are only retrieved during the periodical checks (check A) or during a possible failure requiring a troubleshooting of the engine.

Furthermore, at each acquisition of a measure, the computer determines a selection word (or SST, for Selection STatus) depending on the validity of the different likelihood and deviation tests between paths or with respect to the model.

By way of example, FIG. 6 is a selection table for a redundant measure of a turbojet engine.

The first and second columns represent the validity statuses relating to likelihood tests for the first and second paths respectively. The third column represents the status of the model. The fourth, fifth and sixth columns represent the validity statuses relating to the deviation tests between the first and second paths, between the first path and the model, and between the second path and the model, respectively. The seventh column (shady) represents the value or the path selected by the computer and the last column represents the SST selection word which indicates the selection status.

It should be noticed that, according to the engine considered, the SST selection words can assume the same value for different inputs of the selection table. It will be noticed that this particular case does not concern all turbojet engines and may vary according to the engine manufacturer.

For example, in the first row of the selection table, all the tests are valid, the computer takes the average of the measures of both paths and the SST selection word is 1. In the seventh and eighth rows, a likelihood test of one of the paths is false, the computer selects the valid path, and the SST selection word is also 1. Thus, one of the likelihood and deviation tests between paths can be invalid without changing the value of the SST selection word, which then remains at its nominal value of 1.

This non-uniqueness of the value of the SST selection word, which appears in the least likely failure cases (invalid deviation test but possible localisation of the failing path, or invalid likelihood test of the path but guaranty of the health of the other path), does not allow accurate information about the measuring chain to be given.

Besides, it will be noted that the deviation thresholds are sized in order not to degrade the thrust and the drivability of the engine and above all not to trigger false alarms.

Particularly, the bounds of the likelihood tests are those of the sensor measure range, broadened by the accuracy of the entire measuring chain to which a safety threshold is added.

Regarding the deviation test, the threshold value is generally computed by taking two and a half times the full accuracy scale of the measuring chain. In order to remain robust, this test is thus deliberately wide and allows a great drift of the measure before its status is declared invalid.

Therefore, the diagnostic tests provided by the regulation to not allow intermittent phenomena of the measuring chain to be relevantly monitored.

The object of the present invention is to provide a system for monitoring intermittent contacts and noise on a measuring chain of a turbojet engine in order to detect or predict a degradation that could lead to a failure.

DISCLOSURE OF THE INVENTION

The present invention is defined by a system for monitoring a measuring chain arranged to collect over time measures relating to an aircraft turbojet engine, said system including processing means configured to build a health indicator of said measuring chain based on counting transitions between successive health words defining a validity score for corresponding successive measures.

This allows intermittent evolutive phenomena to be observed in order to predict a breakdown in a long or short term.

According to a first embodiment, the system includes acquiring means for acquiring over time said measures collected by the measuring chain, and the processing means are configured to build said health words by using likelihood and deviation tests between redundant paths of said measuring chain, said likelihood and deviation tests being defined according to parametering thresholds specifically selected for monitoring the measuring chain.

This increases the flexibility in the monitoring system and allows generic health words to be built for all the measures while optimizing the monitoring of intermittent phenomena.

Advantageously, the processing means are configured to change the values of parametering thresholds as a function of the observable measured by the measuring chain.

Thus, the threshold values can be modified and narrowed to be relevant with respect to the information being sought.

According to a second embodiment, the system includes acquiring means for retrieving said health words from a computer connected to said measuring chain, said health words corresponding to selection words (SST) already computed by said computer depending on the validity of likelihood tests, depending on a deviation between redundant paths of said measuring chain, and depending on deviations with respect to a model of said paths. This allows the design load to be reduced.

According to a third embodiment, the system includes acquiring means for retrieving the health words from a computer connected to said measuring chain, said health words corresponding to maintenance words determined beforehand by said computer from the invalidated likelihood or deviation tests. This also allows the design load to be reduced while being applicable to all the targets.

Advantageously, the processing means are configured to compute a variance indicator for each redundant path included in said measuring chain. This allows information regarding the health of each redundant path of the measuring chain to be given.

Advantageously, the processing means are configured to analyse in-flight evolution of the flight health indicators in order to detect intermittent contacts on said measuring chain.

Advantageously, in case intermittent contacts are detected, the processing means are configured to analyse in-flight evolution of the flight variance indicators in order to locate the failing path.

The invention also aims at an aircraft turbojet engine including at least one measuring chain and one monitoring system according to any of the preceding characteristics.

The invention also aims at a method for monitoring a measuring chain arranged to collect over time measures relating to an aircraft turbojet engine, said method including the steps of building a health indicator for said measuring chain based on counting transitions between successive health words defining a validity score for corresponding successive measures.

BRIEF DESCRIPTION OF THE DRAWINGS

FIG. 3 is a configuration table showing the building of health words according to the preferred embodiment of the invention;

FIG. 4 illustrates a given table of the health indicator, according to the invention;

FIG. 6 is a selection table showing building of a selection word for a redundant measure of a turbojet engine.

DETAILED DISCLOSURE OF PARTICULAR EMBODIMENTS

The idea underlying the invention is to extract a health indicator from the measuring chain of a turbojet engine in order to observe intermittent and evolutive phenomena specific to the measuring chain.

Figure 1:
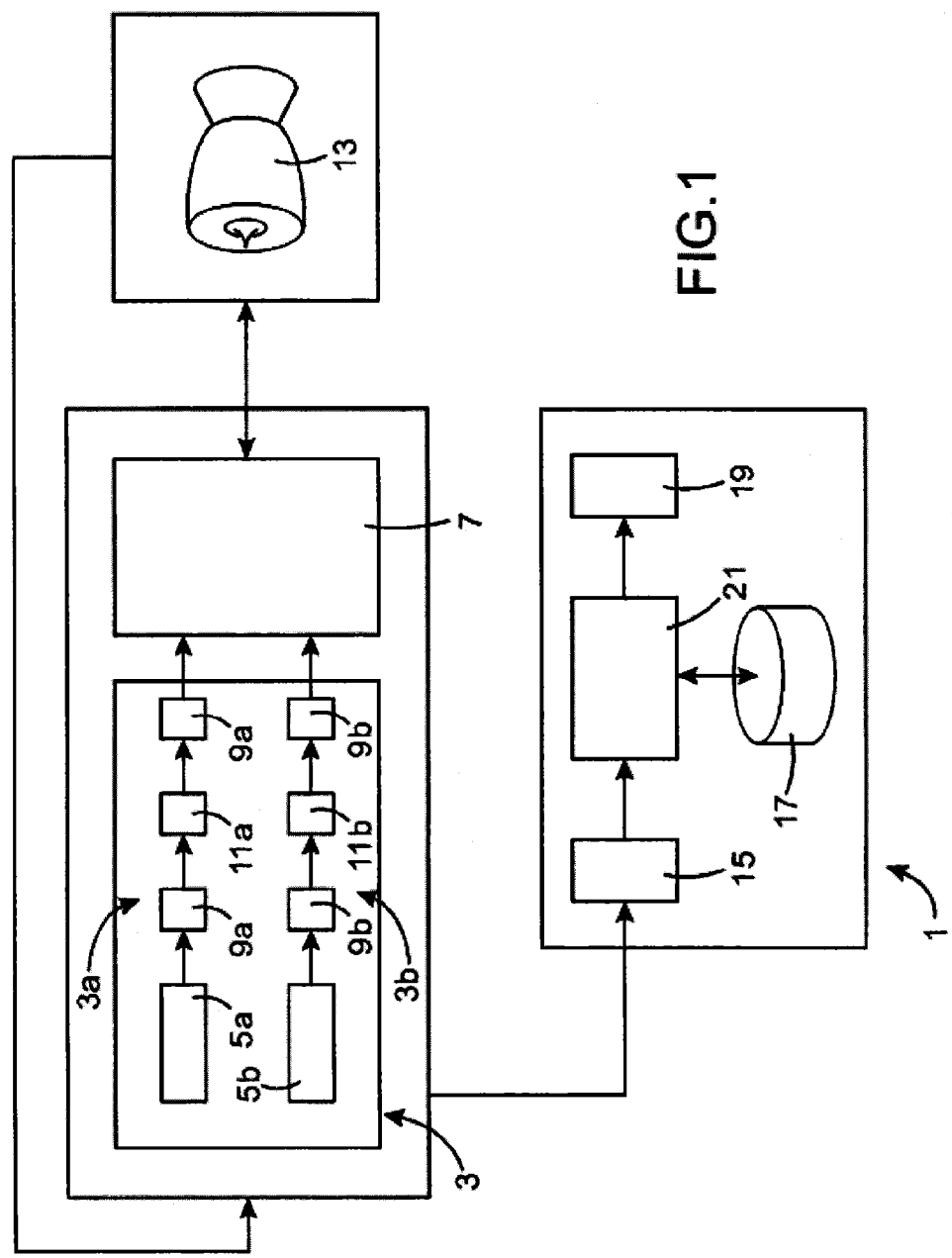
FIG. 1 schematically illustrates a system for monitoring a measuring chain of an aircraft turbojet engine, according to the invention.

FIG. 1 schematically illustrates a system for monitoring a measuring chain of an aircraft engine or turbojet engine, according to the invention.

The measuring chain 3 illustrated includes two redundant paths 3a, 3b intended to collect over time physical measures relating to the turbojet engine. These measures may correspond to a parameter or observable among the following observables: temperatures, pressures, speeds, LVDT, etc.

The first path 3a comprises a first probe (or sensor) 5a connected to a computer 7 through a first series of connectors 9a and harnesses 11a. The second path 3b has a second probe 5b connected to the computer 7 through a second series of connectors 9b and harnesses 11b. The computer 7 (for example, a FADEC) is arranged to process the measures provided by the measuring chains to control the engine or turbojet engine 13.

The monitoring system 1 includes acquiring means 15 for acquiring data about the turbojet engine 13 from the measuring chain 3 and/or the computer 7, storing means 17, output means 19 and means 21 for processing the information for running one or more computer programs comprising program code instructions, stored in the storing means 17 and designed for implementing monitoring of a measuring chain 3.

In accordance with the invention, the processing means 21 are configured to build a health indicator for the measuring chain 3 based on counting transitions between successive health words defining a validity score (or a weight) for corresponding successive measures.

More particularly, the health indicator corresponds to a matrix comprising the occurrence proportions of transitions of successive health words during the flight.

The health indicators during these different flights can be registered into a database stored for example in the storing means 17 to be thereafter recompiled in a perspective of a trending analysis in order to forecast a failure case of the measuring chain 3 and to locate the equipment responsible for the erroneous measure.

Figure 2:
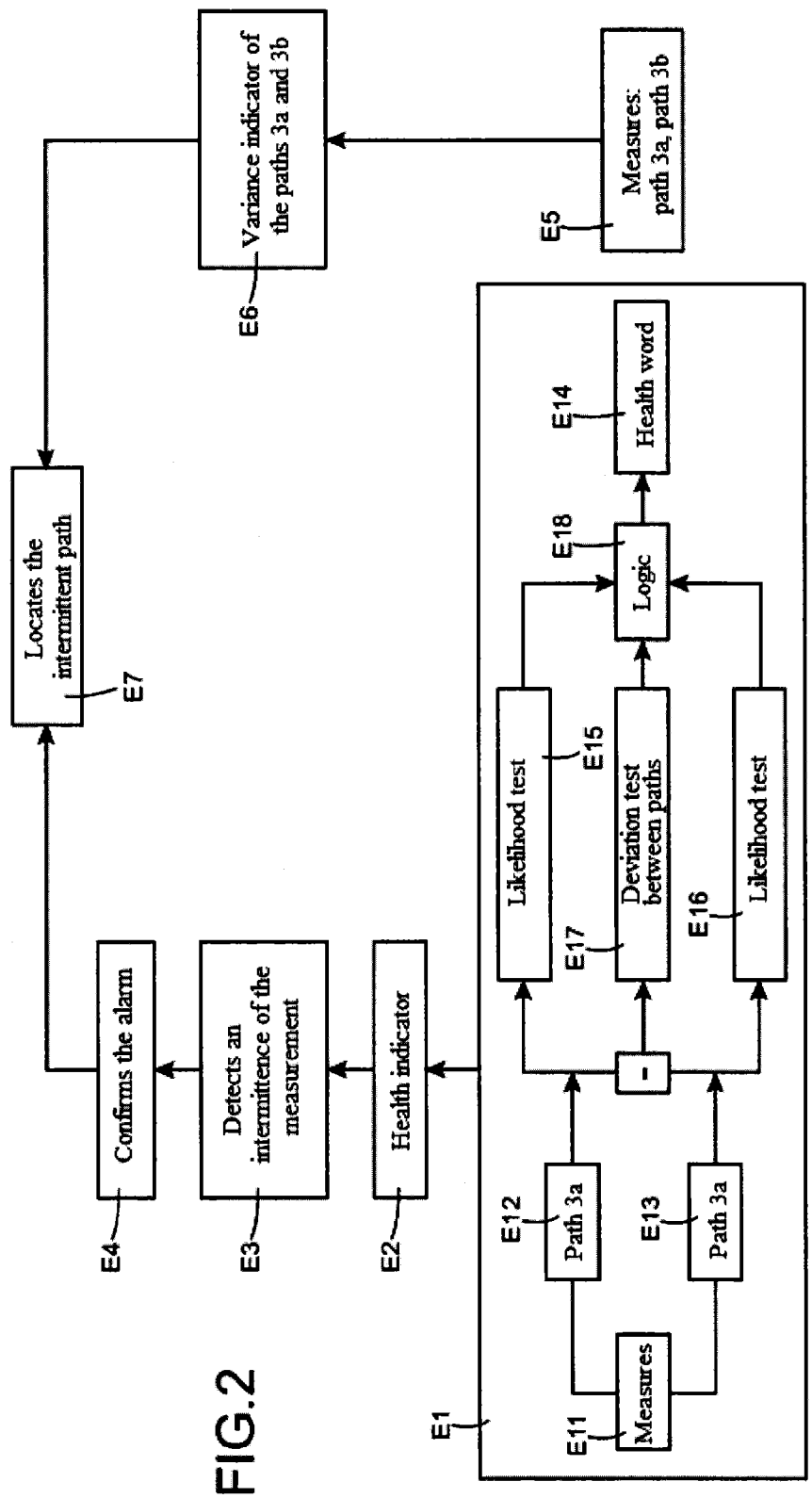
FIG. 2 is a block diagram illustrating the method for monitoring a measuring chain of an aircraft turbojet engine, according to a preferred embodiment of the invention.

FIG. 2 is a block diagram illustrating the method for monitoring a measuring chain of an aircraft turbojet engine, according to a preferred embodiment of the invention.

In block E1, the acquiring means 21 are configured to acquire over time the measures (block E11) collected by redundant paths 3a, 3b of the measuring chain 3 (blocks E12, E13). Furthermore, the processing means 21 are configured to build the health words (block E14) by using likelihood (blocks E15, E16) and deviation tests between the redundant paths (block E17) of the measuring chain 3 according to a logic (block E18) that can be expressed by a particular configuration table illustrated in FIG. 3.

The first and second columns of the table illustrated in FIG. 3 represent the validity statuses relating to likelihood tests of the first path 3a and of the second path 3b respectively. The third column represents a validity status relating to the deviation test between the paths 3a and 3b. The fourth column represents the health word defined by an integer chosen among five numbers. For example, when all the tests are valid, the health word is 1. On the contrary, when both likelihood tests are invalid, the health word is 5.

Thus, unlike the regulation, only the likelihood tests E15, E16 of both paths 3a, 3b and the deviation test E17 between the paths 3a and 3b are used to build the health words. The comparison with a possible model or external measure is irrelevant to monitoring intermittent contacts.

This allows the configuration tables of health words to be built in a simple and generic way for all the measures, unlike the selection tables of the regulation which are specific to each observable or measure type and which comprise more inputs (see FIG. 6).

Besides, the likelihood E15, E16 and deviation E17 tests are defined depending on parametering thresholds specifically selected for monitoring the measuring chain 3. The grid of parametering thresholds according to the invention is a triplet made up of a lower threshold of the likelihood test, an upper threshold of the likelihood test, and a threshold of the deviation test. This grid can be created in a narrowed manner up to reach the natural variance of the deviation between the paths. Thus, these thresholds are selected in a narrower way than those set for the regulation.

Indeed, by observing the evolution of a measure in stabilized phase on a flight, it is noticed that the deviation between paths is about two orders of magnitude lower than the threshold of the deviation test of the regulation. Strong transients create very occasional more significant deviations, but the latter remain one order of magnitude lower than the deviation threshold set by the regulation. Thus, the threshold set for the regulation (in particular for the deviation test between the paths) are very wide in a perspective of robustness.

Since the monitoring of intermittent contacts of the measuring chain 3 does not have the same purposes nor the same constraints as the regulation, these thresholds are advantageously narrowed in order to be more relevant with respect to the information being sought.

Advantageously, the processing means 21 are configured to change the values of the parametering thresholds as a function of the observable measured by the measuring chain 3.

Furthermore, with each observable, can be associated several parametering grids. Indeed, for the deviation test threshold, any value included in an interval starting from the natural noise of the measure up to the regulation threshold can be selected.

In block E2, the processing means 21 extract the health indicator of the measuring chain 3 from the health words created during the flight in the block E1.

FIG. 4 illustrates a table for building the health indicator. The latter is a 5-order "counting" square matrix the coefficients of which correspond to the numbers of transitions between successive health words created during the flight.

More particularly, the rows (i=1 to i=5) represent the weight (1 to 5 respectively) of the health words at an instant t and the columns (j=1 to j=5) represent the weight (1 to 5 respectively) of the health words at the following instant t+1. Thus, each coefficient $a_{ij}$ is a counter indicating the number of successive transitions between a health word with a weight i and a health word with a weight j during the flight.

At the beginning of the flight, the counting matrix is empty (that is, the null matrix) and gradually, (that is, at each instant t), the counter of the corresponding coefficient is incremented. The incrementation depends on the measured observable since not all the observables are measured at the same frequency.

For example, in the case of a sound measuring chain 3, there will be during the flight only transitions of a health word having the value of 1 towards a health word of value 1. This forms a matrix all the coefficients of which are zero except for the coefficient $a_{11}$ which will be equal to the duration of the flight multiplied by the acquiring frequency of the measure. Besides, it will be noted, that for a given observable (temperature, pressure, speed, etc.), several counting matrices can be built: a matrix for each parametering grid.

The health indicator can be easily transmitted to the ground via the output means 19. It will be noticed that the counting matrix is relatively small (for example, 5×5), which reduces the transmission cost of the messages comprising the health indicators of different observables.

In block E3, the processing means 21 are configured to analyse in-flight evolution of the flight health indicators in order to detect intermittent contacts on the measuring chain 3.

Indeed, each health indicator extracted during each current flight can be registered in the storing means 17. This allows the trending of the measure evolution to be monitored given that an intermittent phenomenon generates form flight to flight a particular degradation signature which allows a failure to be predicted in a short or long term.

In block E4, if the prediction of a degradation is confirmed for several flights, an alarm is then triggered. This prevents false alarms from being emitted.

It will be noted that in the case where only the deviation test is invalid, the health indicator extracted in block E3 alone does not allow the failing path to be located.

Thus, in block E6, the processing means 21 are configured to compute from the measures (block 5) a further variance indicator for each redundant path 3a, 3b of the measuring chain 3. The variance indicator may correspond to a maximum value of a standard deviation on the current flight, or a value taken by a sliding standard deviation during a transition of a health word.

In the case where intermittent contacts are detected (block E4), the processing means 21 are configured to analyse the in-flight evolution of the flight variance indicators in order to locate the failing path (block E7). In particular, the information coming from blocks E4 and E5 are analysed in block E7 to determine the failing path. Indeed, a path with a great variance (that is, a very variant or very noisy path) confirms a problem of intermittent contact at this path.

Figure 5A:
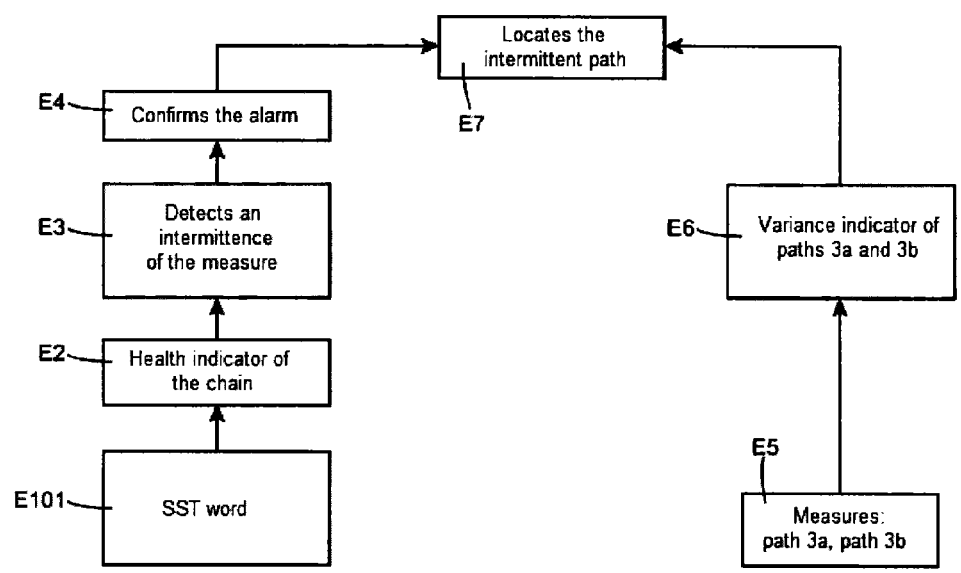
FIGS. 5A and 5B illustrate block diagrams of the method for monitoring a measuring chain of an aircraft turbojet engine, according to other embodiments of the invention.
Figure 5B:
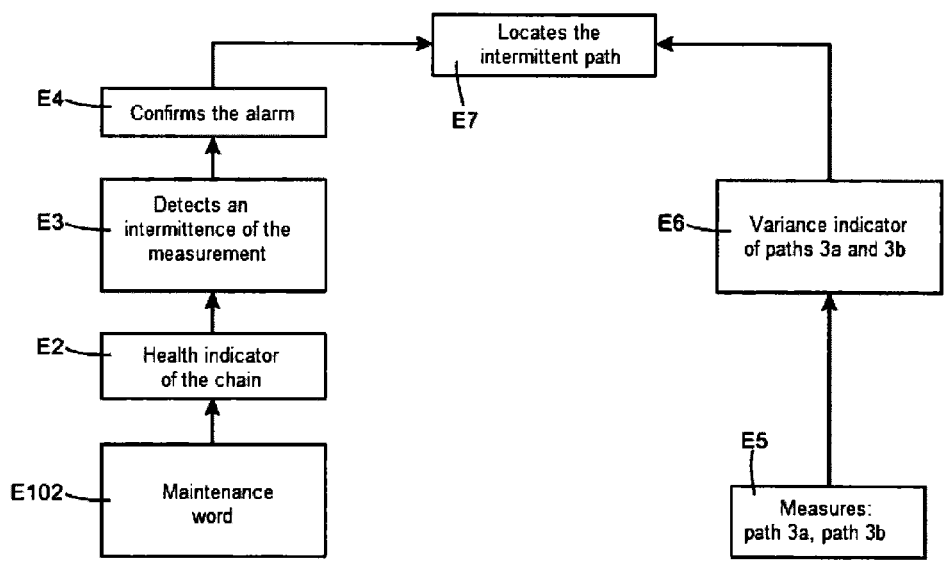

FIGS. 5A and 5B illustrate block diagrams of the method for monitoring a measuring chain of an aircraft turbojet engine, according to second and third embodiments of the invention.

The embodiments of FIGS. 5A and 5B can only be distinguished from that of FIG. 2 through the nature and origin of the health words.

Indeed, in FIG. 5A, all the blocks are similar to those of FIG. 2 except for block E1 which is replaced by block E101.

In block E101, the acquiring means 15 are configured to retrieve the health words from the computer 7 connected to the measuring chain 3. According to this second embodiment, the health words correspond to SST selection words of the regulation which are already computed by the computer 7 according to the validity of the likelihood tests, deviation tests between redundant paths of the measuring chain 3, and deviation tests with respect to a model (see FIG. 6). It will be noted that the building tables for the SST selection words are specific to each observable.

In the embodiment of FIG. 5b, all the blocks are also identical to those of FIG. 2 except for the block E1 which is replaced by block E102.

In block E102, the acquiring means 15 are configured to retrieve the health words from the computer 7 connected to the measuring chain 3. According to this third embodiment, the health words correspond to maintenance words determined beforehand by the computer 7 from the likelihood or deviation tests that can be valid or non valid.

The embodiments of FIGS. 5A and 5B allow computing time to be reduced given that the health words are already made by the regulation. However, this computing time saving is achieved to the detriment of an accuracy loss since these health words come from tests showing less narrowed thresholds.

Thus, the choice between the three embodiments can be made depending on available data and accuracy, computing time or transmission costs constraints.

The invention claimed is:

1. A system for monitoring a measuring chain arranged to collect measurements relating to an aircraft turbojet engine, the system comprising:
   circuitry configured to:
      build health words by using likelihood and deviation tests between redundant paths of the measuring chain, the likelihood and deviation tests being defined according to parametering thresholds specifically selected for monitoring the measuring chain;
      build a health indicator of the measuring chain based on counting transitions between successive health words defining a validity score for corresponding successive measurements to detect or predict degradation that could lead to failure of the measuring chain; and
      acquire the measurements collected by the measuring chain,
      wherein the circuitry is configured to change values of the parametering thresholds as a function of an observable measured by the measuring chain.

2. The system according to claim 1, wherein the circuitry is configured to compute a variance indicator for each redundant path included in the measuring chain.

3. The system according to claim 1, wherein the circuitry is configured to analyze in-flight evolution of flight health indicators to detect intermittent contacts of the measuring chain.

4. The system according to claim 3, wherein in a case intermittent contacts are detected, the circuitry is configured to analyze the in-flight evolution of the flight health indicators to locate a failure path.

5. The system according to claim 1, wherein only the likelihood and deviation tests between the redundant paths of the measuring chain are used to build the health words.

6. The system according to claim 1, wherein the circuitry is configured to build a health indicator table, wherein each row of the health indicator table corresponds to a different health word measured at a first time, and each column of the health indicator table corresponds to the different health word measured at a second time, the first time and the second time being successive measures of time.

7. A system comprising:
   at least one measuring chain; and
   at least one monitoring system for monitoring the at least one measuring chain arranged to collect measurement relating to an aircraft turbojet engine, the at least one monitoring system including:
      circuitry configured to:
         build health words by using likelihood and deviation tests between redundant paths of the at least one measuring chain, the likelihood and deviation tests being defined according to parametering thresholds specifically selected for monitoring the at least one measuring chain;
         build a health indicator of the at least one measuring chain based on counting transitions between successive health words defining a validity score for corresponding successive measurements to detect or predict degradation that could lead to failure of the at least one measuring chain; and
         acquire the measurements collected by the at least one measuring chain,
      wherein the circuitry is configured to change values of the parametering thresholds as a function of an observable measured by the at least one measuring chain.

8. A method for monitoring a measuring chain arranged to collect measurements relating to an aircraft turbojet engine, the method comprising:
   building health words by using likelihood and deviation tests between redundant paths of the measuring chain, the likelihood and deviation tests being defined according to parametering thresholds specifically selected for monitoring the measuring chain;
   building a health indicator of the measuring chain based on counting transitions between successive health words defining a validity score of corresponding successive measures to detect or predict degradation that could lead to failure of the measuring chain; and
   changing values of the parametering thresholds as a function of an observable measured by the measuring chain.

* * * * *